United States Patent Office 2,867,496
Patented Jan. 6, 1959

2,867,496

PROCESS FOR THE RECOVERY OF ZINC SULPHATE FROM SOLUTIONS OF ZINC SULPHATE AND MAGNESIUM SULPHATE

Edwin Holroyd Sharples, Kenilworth, England, assignor to Courtaulds Limited, London, England, a British company No Drawing. Application December 3, 1954
Serial No. 473,052

Claims priority, application Great Britain January 6, 1954

3 Claims. (Cl. 18—54)

This invention relates to the recovery of chemicals used in viscose spinning baths and processing liquors.

United States Patent No. 2,192,074 describes a process for making high tenacity threads from viscose by coagulating the viscose filaments in a dilute acid bath containing sulphuric acid and also sufficient metallic sulphates, usually a mixture of sodium sulphate and zinc sulphate, to delay the decomposition to cellulose hydrate and then stretching the filaments, after they have left the coagulant bath, in the presence of hot dilute acid at a temperature of at least 60° C. As the filaments carry coagulating bath liquor over into the hot acid stretching bath, the metallic sulphates tend to accumulate in the stretching bath liquor and it is customary to dilute the liquor, either continuously or intermittently, in order to maintain the concentration of the hot acid stretching bath substantially constant. The spent liquid from the acid coagulating bath and the hot acid stretching bath and other waste acid- and zinc-containing liquors from the process are treated with lime in the effluent plant to remove sulphuric acid and zinc sulphate. All the zinc remains in the effluent mud as zinc hydroxide together with calcium sulphate and magnesium hydroxide derived from the lime used in the effluent plant. The effluent mud is normally discarded as waste. If the mud is treated with sulphuric acid and filtered, the filtrate will consist of zinc sulphate and magnesium sulphate in solution. If this solution is treated with caustic soda solution under such conditions that the zinc hydroxide precipitates in separable form, the magnesium will be precipitated at the same time so that after a number of recovery processes the percentage of magnesium sulphate will build up owing to the magnesium being continually added to the effluent system.

The object of the present invention is to recover zinc from solutions containing both zinc sulphate and magnesium sulphate.

According to the present invention, a process for the recovery of zinc sulphate from solutions containing zinc sulphate and magnesium sulphate comprises adding powdered calcium carbonate to the solution, heating the mixture to a temperature within the range of 65° to 95° C. to precipitate the zinc as a basic zinc carbonate and leave the magnesium sulphate in solution, removing the precipitated material and dissolving it in sulphuric acid to produce a zinc sulphate solution substantially free from magnesium sulphate.

The process of the present invention is preferably carried out using powdered chalk to precipitate the basic zinc carbonate.

The process of the present invention is particularly applicable to the recovery of zinc sulphate from a solution of zinc sulphate and magnesium sulphate obtained from an effluent mud from an effluent plant for the treatment of spent liquid from the production of viscose rayon threads.

Such an effluent mud may contain for example 3 to 6 percent of zinc hydroxide, 20 to 30 percent of calcium sulphate, 0.5 to 1.0 percent of magnesium hydroxide and 5 to 10 percent of calcium hydroxide and carbonate, ferrous hydroxide and aluminum hydroxide, and small quantities of metal sulphides. The material can be treated with dilute sulphuric acid to dissolve the zinc, magnesium, ferrous and aluminum hydroxides and leave the calcium sulphate undissolved. The insoluble calcium sulphate may be removed by settling or filtration. The filtrate may be treated with an oxidising agent for example sodium hypochlorite or sodium bichromate to convert the ferrous sulphate to ferric sulphate. The iron and aluminum may be removed by treating with calcium carbonate until a chemical test indicates that the solution is free from ferric iron, the mixture is then filtered, and the filtrate obtained may be treated by the process of the present invention to separate the zinc sulphate from the magnesium sulphate.

In carrying out the process of the present invention the solution of zinc sulphate and magnesium sulphate is run into a tank fitted with a stirrer and powdered calcium carbonate is added to the solution. The slurry is heated, for example by passing steam into the slurry and the mixture is stirred. When the temperature of the slurry reaches 65° C. the precipitation of the zinc as a basic carbonate begins with evolution of carbon dioxide. When the precipitation of the zinc is complete, the mixture is filtered, the filter cake obtained contains substantially all of the zinc and the filtrate contains substantially all of the magnesium. The filter cake is washed and treated with sulphuric acid to obtain a solution of zinc sulphate.

In dissolving the effluent mud and in dissolving the basic zinc carbonate sulphuric acid may be used which has been collected from the viscose rayon factory for example, the spent hot acid stretching bath may be used and the so-called canal liquor may be used, that is the liquor collected as drippings from the godets on the spinning machines and excess liquor removed by centrifuging the viscose rayon cakes. By using these liquors as the source of sulphuric acid in these stages of the process, economies in the treatment of the main effluent system are effected. The liquors can be used as the temperature at which they are collected from the spinning machines.

The invention is illustrated by the following examples in which the parts and percentages are by weight.

Example 1

224 parts of effluent mud from the treatment of spent viscose rayon processing liquors containing the equivalents of 7.2 parts of zinc oxide and 5.65 parts of calcium hydroxide were mixed with 700 parts of a spent hot acid stretching bath containing 16.3 parts of sulphuric acid and 6.08 parts of zinc sulphate. Any ferrous iron present was oxidised with chlorine, sodium hypochlorite or sodium bichromate and the ferric iron was precipitated by the addition of powdered chalk until a chemical test showed that the solution was free from ferric iron. 924 parts of slurry were obtained containing 20.4 parts of zinc sulphate and 1.3 parts of magnesium sulphate in solution and 70 to 80 parts of calcium sulphate in suspension. The slurry was allowed to settle and was filtered and the filter cake was washed. The filtrate and washings consisted of 850 parts of liquid containing 2.35 percent zinc sulphate and 0.15 percent magnesium sulphate at a temperature between 60° and 75° C. 15 parts of powdered chalk were added to the liquid and the temperature was raised to 80° to 95° C. by passing live steam into the liquid. Carbon dioxide was evolved and the zinc was precipitated. The mixture was filtered, the filtrate containing the magnesium sulphate free from zinc sulphate was allowed to run to waste. The filter cake contained zinc carbonate equivalent to 12.5 parts of zinc hydroxide and was mixed with 170 parts of the canal liquor containing 10.4 parts of sulphuric acid and 3.4 parts of zinc sulphate. An additional 2 parts of sulphuric acid were added, the mixture obtained was filtered and the filter cake washed. The filtrate and washings consisted of 200 parts of 12 percent solution of zinc sulphate free from magnesium sulphate and the filter cake contained 20 parts of calcium sulphate.

*Example 2*

100 parts of effluent mud, from the treatment of spent viscose rayon processing liquors, containing the equivalent of 7.2 parts of zinc oxide were treated with 236 parts of a mixture of spent hot acid stretching bath containing 2.3 percent of sulphuric acid and 0.90 percent of zinc sulphate and canal liquor containing 6.15 percent of sulphuric acid and 2.0 percent of zinc sulphate. The mixture was oxidised, filtered and washed to free the solution from iron. The filtrate consisted of 280 parts of liquid containing 9 parts of zinc sulphate and 0.6 part of magnesium sulphate. 6 parts of powdered chalk were added to the liquid and the slurry obtained was heated to 90° C. and was allowed to settle before filtering. The filtrate containing the magnesium sulphate was run to waste. The filter cake containing 5 to 6 parts of basic zinc carbonate, 7.4 parts of calcium sulphate and 40 parts of water was mixed with 5.5 parts of sulphuric acid. The mixture was filtered and the cake was washed. The filtrate was a 20 percent solution of zinc sulphate free from magnesium sulphate and 45 parts of the filtrate were obtained. The filter cake was made up of 7.6 parts of calcium sulphate and 7.6 parts of water.

*Example 3*

100 parts of effluent mud as in Example 1 were mixed with 8 parts of sulphuric acid. The mixture was oxidised, ferric iron was precipitated with powdered chalk, and then the mixture was filtered and washed. The 60 parts of filtrate obtained were mixed with 4.5 parts of powdered chalk, the mixture was heated to 90° C. and after settling the mixture was filtered. The filtrate containing magnesium sulphate was run to waste. The filter cake contained 5.5 parts of calcium sulphate and the equivalent of 3.2 parts of zinc oxide and was treated with 4 parts of sulphuric acid. The mixture was filtered and the filter cake was washed. 32 parts of filtrate and washings were obtained consisting of a 20 percent solution of zinc sulphate free from magnesium sulphate. The filter cake consisted of 5.5 parts of calcium sulphate and 5.5 parts of water. Smaller volumes of liquid were involved in this example than in Examples 1 and 2 since the dilute acid hot stretching bath was not used as the source of sulphuric acid.

What I claim is:

1. In a process for the production of viscose rayon wherein viscose is extruded into a coagulating bath containing sulphuric acid, sodium sulphate and zinc sulphate to form filaments, the filaments are withdrawn from the coagulating bath and are stretched in a hot acid stretching bath containing sulphuric acid, spent liquid is collected from the coagulating bath and treated with lime containing magnesia to form an effluent mud: a method for the recovery of zinc sulphate comprising the steps of treating the mud containing zinc hydroxide, calcium sulphate, magnesium hydroxide and ferrous hydroxide with dilute sulphuric acid to dissolve the zinc hydroxide and ferrous hydroxide and leave the calcium sulphate undissolved, removing the calcium sulphate, treating the filtrate with an oxidising agent to convert ferrous sulphate to ferric sulphate, treating with calcium carbonate until a chemical test indicates that the solution is free from ferric iron, filtering the mixture to obtain a solution of zinc sulphate and magnesium sulphate, adding powdered calcium carbonate to the solution, heating the mixture to a temperature within the range of 65° to 95° C. to precipitate the zinc as a basic zinc carbonate and leave the magnesium sulphate in solution, removing the precipitated material and dissolving it in sulphuric acid to produce a zinc sulphate solution substantially free from magnesium sulphate.

2. A process as claimed in claim 1 wherein the calcium carbonate is chalk.

3. A process as claimed in claim 1 wherein the effluent mud is treated with spent coagulating bath and spent hot acid stretching bath to produce the solution of zinc sulphate and magnesium sulphate.

References Cited in the file of this patent

UNITED STATES PATENTS

| 1,463,483 | Nihoul | July 31, 1923 |
| 1,937,632 | Christensen | Dec. 5, 1933 |
| 1,937,638 | Christensen | Dec. 5, 1933 |
| 2,144,299 | Sessions | Jan. 17, 1939 |

FOREIGN PATENTS

| 678,462 | Great Britain | Sept. 3, 1952 |

OTHER REFERENCES

Mellor: "Comprehensive Treatise on Inorganic and Theoretical Chemistry," vol. 4, page 613, Longmans, Green and Co., N. Y., 1923.